United States Patent
Dong

(10) Patent No.: US 9,214,852 B2
(45) Date of Patent: Dec. 15, 2015

(54) PRECHARGE CIRCUITS AND METHODS FOR DC-DC BOOST CONVERTERS

(71) Applicant: Silergy Semiconductor Technology (Hangzhou) LTD, Hangzhou, ZheJiang Province (CN)

(72) Inventor: Jinping Dong, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 193 days.

(21) Appl. No.: 13/849,623

(22) Filed: Mar. 25, 2013

(65) Prior Publication Data

US 2013/0278239 A1    Oct. 24, 2013

(30) Foreign Application Priority Data

Apr. 20, 2012  (CN) .......................... 2012 1 0119135

(51) Int. Cl.

| | |
|---|---|
| *H02M 1/36* | (2007.01) |
| *H02M 3/158* | (2006.01) |
| *H02M 1/00* | (2007.01) |
| *H02M 3/155* | (2006.01) |
| *G05F 3/26* | (2006.01) |

(52) U.S. Cl.
CPC ............... *H02M 1/36* (2013.01); *H02M 3/158* (2013.01); *G05F 3/26* (2013.01); *H02M 3/155* (2013.01); *H02M 2001/0045* (2013.01)

(58) Field of Classification Search
CPC .......... H02M 2001/0045; H02M 1/36; H02M 3/155; H02M 3/158; G05F 1/468; G05F 3/26
USPC ......... 323/222, 224, 225, 268, 282, 316, 901, 323/908
See application file for complete search history.

(56) References Cited

U.S. PATENT DOCUMENTS

| | | | | |
|---|---|---|---|---|
| 6,969,976 | B1 * | 11/2005 | Broach et al. ................. | 323/222 |
| 7,026,802 | B2 * | 4/2006 | Gradinariu .................... | 323/316 |
| 7,262,586 | B1 * | 8/2007 | Gradinariu .................... | 323/280 |
| 7,276,888 | B2 * | 10/2007 | Thiele et al. .................. | 323/282 |
| 7,560,910 | B2 * | 7/2009 | Hata et al. ..................... | 323/222 |
| 7,898,227 | B2 * | 3/2011 | Huang et al. .................. | 323/222 |
| 8,018,214 | B2 * | 9/2011 | Kwon et al. ................... | 323/271 |
| 8,476,878 | B2 * | 7/2013 | Hoon et al. .................... | 323/271 |
| 8,624,569 | B2 * | 1/2014 | Heng ............................. | 323/282 |
| 2007/0273347 | A1 * | 11/2007 | Chuang et al. ................. | 323/282 |

* cited by examiner

*Primary Examiner* — Fred E Finch, III
(74) *Attorney, Agent, or Firm* — Michael C. Stephens, Jr.

(57) ABSTRACT

The present invention discloses precharge circuits and methods for DC-DC boost converters. In one embodiment, a precharge method for a DC-DC boost converter having a current mirror circuit that includes a reference transistor and a power transistor, can include: (i) maintaining a reference current flowing through the reference transistor as substantially constant; (ii) maintaining a drain-source voltage of the reference transistor and a drain-source voltage of the power transistor as substantially equal; and (iii) obtaining a substantially constant mirror current by reflecting the reference current through the power transistor to operate as a precharging current of a precharge circuit.

20 Claims, 5 Drawing Sheets

PRECHARGE CIRCUITS AND METHODS FOR DC-DC BOOST CONVERTERS

RELATED APPLICATIONS

This application claims the benefit of Chinese Patent Application No. 201210119135.0, filed on Apr. 20, 2012, which is incorporated herein by reference in its entirety.

FIELD OF THE INVENTION

The present invention relates to the field of power electronics, and more specifically to precharge circuits and methods for DC-DC boost converters.

BACKGROUND

DC-DC boost converters are typically used in various electronics devices to convert one DC voltage level to another regulated level. During a start-up procedure, a DC-DC boost converter is generally precharged before normal start-up operation in order to avoid potential damage that might be caused by a relatively large surge current. In some cases, an output voltage can be precharged nearly to an input voltage level. Therefore, a precharge circuit may be utilized in the circuit design of a DC-DC boost converter.

SUMMARY

Particular embodiments can provide precharge circuits and methods for DC-DC boost converters.

In one embodiment, a precharge method for a DC-DC boost converter including a current mirror circuit having a reference transistor and a power transistor, can include: (i) maintaining a reference current flowing through the reference transistor as substantially constant; (ii) maintaining a drain-source voltage of the reference transistor and a drain-source voltage of the power transistor as substantially equal; and (iii) obtaining a substantially constant mirror current by reflecting the reference current through the power transistor to operate as a precharging current of a precharge circuit.

In one embodiment, a precharge circuit configured with a DC-DC boost converter, can include: (i) a current mirror circuit having a reference transistor and a power transistor; (ii) a voltage clamping circuit coupled to the current mirror circuit, where the voltage clamping circuit is configured to maintain drain-source voltages of the reference transistor and the power transistor as substantially equal; and (iii) a current regulating circuit coupled to the current mirror circuit and the voltage clamping circuit, where the current regulating circuit is configured to compare a voltage from the voltage clamping circuit against a reference voltage, and to control in response thereto regulation of a reference current and a precharging current of the precharge circuit as substantially constant.

Embodiments of the present invention can advantageously provide several advantages over conventional approaches. For example, by controlling a drain-source voltage of a reference transistor to follow a drain-source voltage variation of a power transistor, and maintaining a reference current of the reference transistor substantially stable, a current of the power transistor can be controlled as substantially stable. In addition, a precharging current of the DC-DC boost converter can be maintained at an expected start-up current value rather than changing along with the output voltage. Further, the precharging current can be relatively small and maintained as substantially constant for a relatively a long period, resulting in potentially reduced power losses and higher reliability, as compared to conventional approaches. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
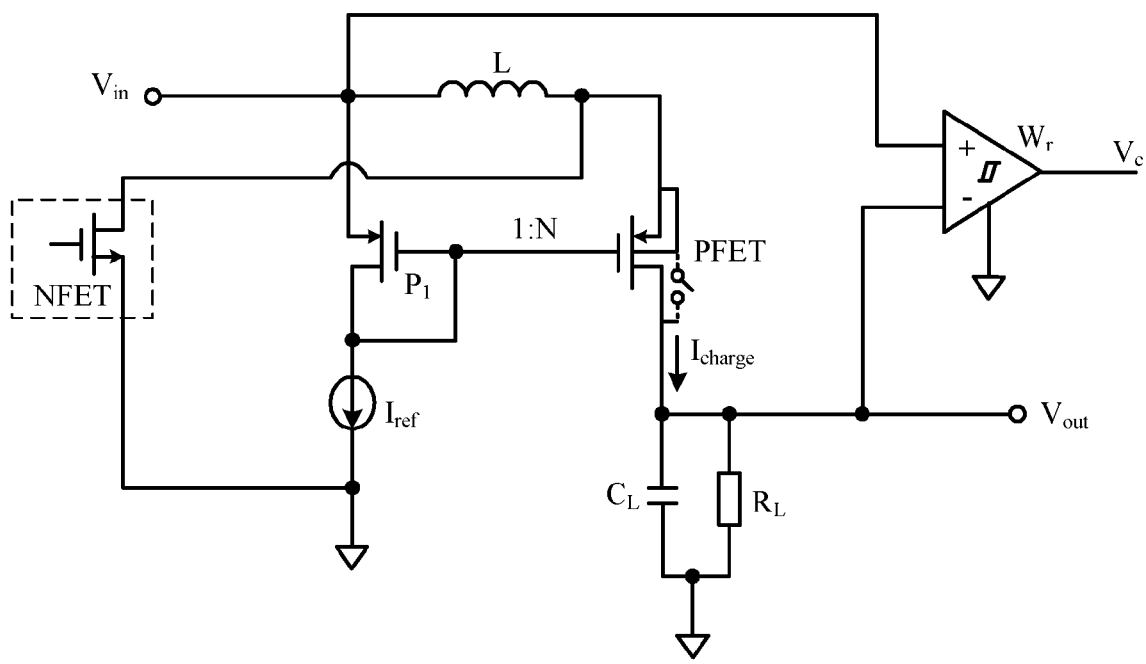
FIG. 1A shows a schematic diagram of an example precharge circuit.

With reference to FIG. 1A, shown is an example precharge circuit. In this example, power transistor PFET and reference transistor $P_1$ can be configured as a current mirror circuit, and a drain voltage of power transistor PFET can be configured as an output voltage. Before normal start-up, the precharge circuit can precharge the output voltage nearly to an input voltage level. Hysteresis comparator $W_r$ can be used to receive the output voltage and input voltage, and to generate a precharge control signal. The precharge control signal can be used to shift the precharge start-up state and the normal start-up state. Power switch NFET may remain off during the precharge start-up phase. However, as the output voltage may continue to increase, a source-drain voltage of power transistor PFET may decrease, and charging current $I_{charge}$ may also decrease.

Figure 1B:
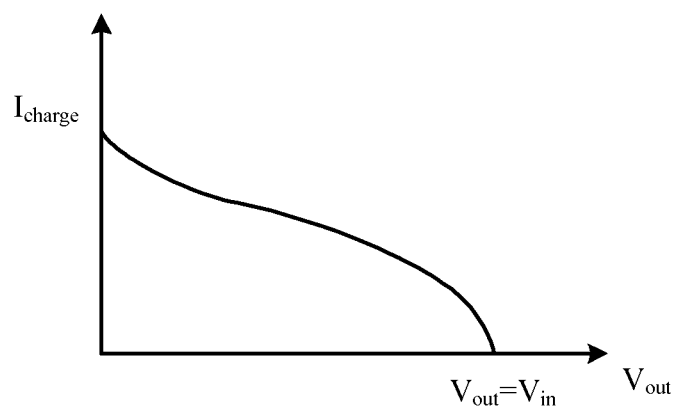
FIG. 1B shows an example waveform diagram of the precharge circuit shown in FIG. 1A.

Referring now to FIG. 1B, shown is an example waveform diagram of the precharge circuit shown in FIG. 1A. Charging current $I_{charge}$ may decrease as output voltage $V_{out}$ continues to increase. When output voltage $V_{out}$ is relatively close to input voltage $V_{in}$, charging current $I_{charge}$ may reduce to a relatively low value (e.g., close to zero). As a result, a relatively large load may not be able to be sufficiently supplied at start-up. Thus, the load "scope" may be limited during the start-up phase, and the start time of the DC-DC boost converter may be accordingly delayed.

The present invention discloses precharge circuits and methods for DC-DC boost converters. In an example precharge circuit, a reference current flowing through a reference transistor can remain substantially unchanged, and a drain voltage of the reference transistor can change along with a drain voltage of a power transistor. As a result, a current mirror circuit can be formed by the reference transistor and the power transistor during the precharge procedure. Also, by reflecting the reference current through the power transistor, a constant mirror current can be obtained as the precharging current, and the precharging current of the precharge circuit can remain substantially constant.

Particular embodiments may not only achieve precharge of the output voltage, but also can maintain the precharging current as substantially unchanged to meet relatively fast start-up requirements during the precharge phase. Also, precharge control techniques as described herein may utilize a relatively small precharging current, and the precharging current can remain substantially constant for a relatively a long period. As a result, power losses can be relatively low, and circuit stability can be relatively high, as compared to conventional approaches.

In one embodiment, a precharge circuit configured with a DC-DC boost converter, can include: (i) a current mirror circuit having a reference transistor and a power transistor; (ii) a voltage clamping circuit coupled to the current mirror circuit, where the voltage clamping circuit is configured to maintain drain-source voltages of the reference transistor and the power transistor as substantially equal; and (iii) a current regulating circuit coupled to the current mirror circuit and the voltage clamping circuit, where the current regulating circuit is configured to compare a voltage from the voltage clamping circuit against a reference voltage, and to control in response thereto regulation of a reference current and a precharging current of the precharge circuit as substantially constant.

Figure 2A:
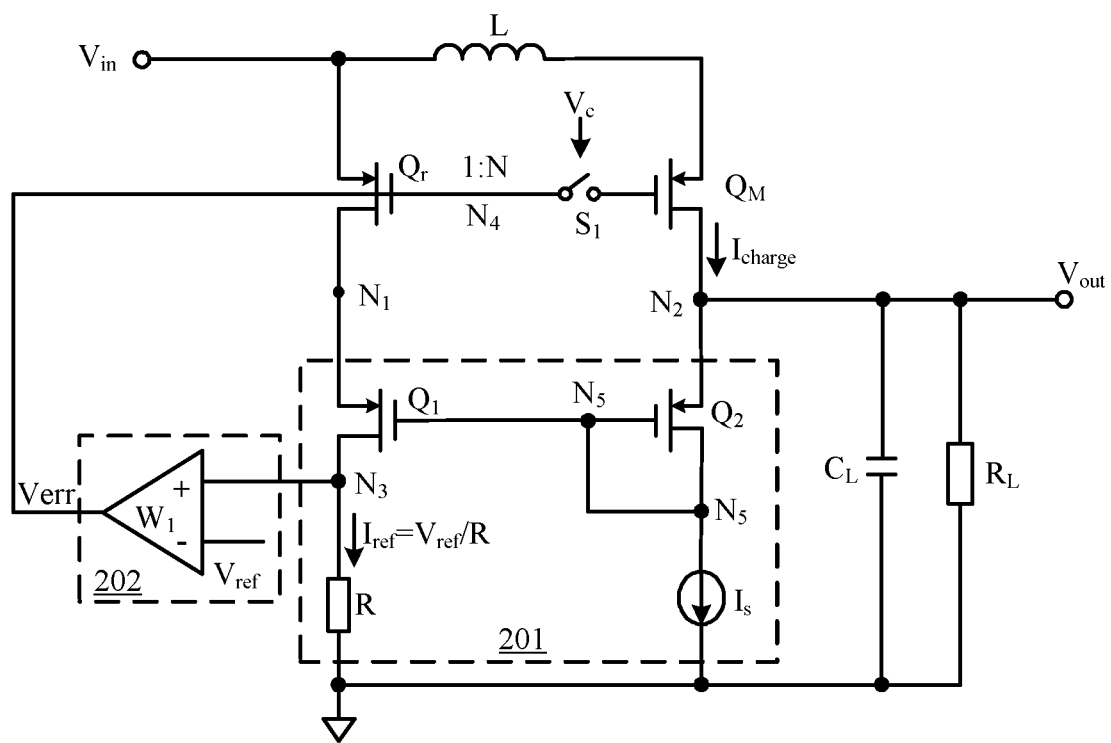
FIG. 2A shows a schematic diagram of an example precharge circuit for a DC-DC boost converter, in accordance with embodiments of the present invention.

Referring now to FIG. 2A, shown is an example precharge circuit for a DC-DC boost converter, in accordance with embodiments of the present invention. In this particular example, the precharge circuit can include reference transistor $Q_r$, where reference transistor $Q_r$ and power transistor $Q_M$ of the DC-DC boost converter can be configured as a current mirror circuit. In some cases, power transistor $Q_M$ can be a model or representative transistor of a DC-DC boost converter power transistor. In addition, reference transistor $Q_r$ and power transistor $Q_M$ may have a 1:N area ratio, or a transistor width ratio, where the two transistors have a same gate length, and a same transistor type (e.g., PMOS or NMOS). Reference transistor $Q_r$ and power transistor $Q_M$ may also be oriented in a same layout direction and in alignment so as to substantially match transistor characteristics.

A drain voltage of power transistor $Q_M$ can be configured as output voltage $V_{out}$. During a precharge start-up phase (e.g., after circuit power is turned on and/or based on a power on reset control signal), output voltage $V_{out}$ can be precharged according to predetermined requirements. For example, output voltage $V_{out}$ can be precharged to about 90% of input voltage $V_{in}$ during the start-up phase. This particular example precharge circuit can also include voltage clamping circuit 201 and current regulating circuit 202. Current regulating circuit 202 can be used to maintain a precharging current of the precharge circuit as substantially constant. As used herein, "substantially" can mean within certain acceptable or predetermined tolerance levels.

In this example, voltage clamping circuit 201 can include transistors $Q_1$ and $Q_2$. Transistor $Q_1$ may be coupled with reference transistor $Q_r$ at $N_1$, and to ground through a sampling circuit (e.g., including sampling resistor R). Transistor $Q_2$ can be coupled with power transistor $Q_M$ at $N_2$, and may be coupled to ground through a current-stabilizer circuit (e.g., including current source $I_S$). A voltage on node $N_2$ can be output voltage $V_{out}$. Gates of transistors $Q_1$ and $Q_2$ can be coupled together at node $N_5$, and a gate and drain of transistor $Q_2$ can be coupled together in a diode connected configuration. Also, the sampling circuit can include sampling resistor R, and the current-stabilizer circuit can be configured by current source $I_s$. However, practitioners having ordinary skill in the art will recognize that the example sampling and current-stabilizer circuits can be replaced by other circuits or components with the same or a similar function.

Current regulating circuit 202 can include error amplifier $W_1$, where a non-inverting input terminal of error amplifier $W_1$ can connect to node $N_3$. Also, an inverting input terminal of error amplifier $W_1$ can receive reference voltage $V_{ref}$. Further, an output terminal of error amplifier $W_1$ can connect to the gates of reference transistor $Q_r$ and power transistor $Q_M$ at node $N_4$.

During the precharge phase of the DC-DC boost converter, when output voltage $V_{out}$ is increasing, the source-drain voltage of power transistor $Q_M$ may gradually decreased. Correspondingly, precharging current $I_{charge}$ may also decrease. Therefore, in order to prevent precharging current $I_{charge}$ from decreasing too much to affect normal start-up of the load, precharging current $I_{charge}$ should be controlled. However, in conventional precharge circuits, since drain-source voltages of the reference transistor and the power transistor are not substantially equal to each other, a constant mirror current may be difficult to obtain. In contrast, particular embodiments can maintain drain-source voltages of reference transistor $Q_r$ and power transistor $Q_M$ as substantially equal to each other. Thus, a substantially constant precharging current can be maintained based on the current mirror relationship.

An example control procedure for a precharging current of particular embodiments will now be described. Firstly, reference current $I_{ref}$ of reference transistor $Q_r$ can be controlled by current regulating circuit 202 to maintain reference current $I_{ref}$ as substantially constant. For example, when reference current $I_{ref}$ is decreasing, the drain voltage of transistor $Q_1$ at node $N_3$ (which represents reference current $I_{ref}$ flowing through reference transistor $Q_T$) may decrease accordingly. When the voltage at node $N_3$ is less than reference voltage $V_{ref}$, error amplifier $W_1$ may output a negative error voltage signal $V_{err}$. Because error voltage signal $V_{err}$ can connect to the gate of reference transistor $Q_r$, the source-gate voltage of reference transistor $Q_r$ may increase. As a result, reference current $I_{ref}$ flowing through reference transistor $Q_r$ can be increased based on the transistor's current-voltage property.

On the other hand, when reference current $I_{ref}$ is increasing, error amplifier $W_1$ may output a positive error voltage signal $V_{err}$ to reduce the source-gate voltage of reference transistor $Q_r$, so as to reduce reference current $I_{ref}$. Here, reference current $I_{ref}$ can be calculated as follows: $I_{ref}=V_{ref}/R$. In this way, reference current $I_{ref}$ flowing through reference transistor $Q_r$ can be controlled as substantially constant through the feedback control of error amplifier $W_1$.

The drain-source voltage of reference transistor $Q_r$ can be regulated to change along with the drain-source voltage of power transistor $Q_M$ through voltage clamping circuit 201. Also, transistor $Q_2$, since the gate and drain of transistor $Q_2$ are connected together, when the source voltage (e.g., output voltage $V_{out}$) is increasing, the gate voltage at node $N_5$ may also increase. For transistor $Q_1$, when the gate voltage at node $N_5$ is increasing, but reference current $I_{ref}$ remains substantially unchanged, the voltage at node $N_1$ may also increase, and the drain voltage of reference transistor $Q_r$ can also increase. Therefore, the drain voltage of reference transistor $Q_r$ can follow the variation of the drain voltage of power transistor $Q_M$.

Voltages at node $N_1$ and $N_2$ may be substantially equal, and the source voltages of reference transistor $Q_r$ and power transistor $Q_M$ are also substantially equal because a voltage drop on inductor L may be relatively small and thus can be neglected. Thus, the drain-source voltages of reference transistor $Q_r$ and power transistor $Q_M$ may also be substantially equal to each other. Based on current mirror principles, the relationship between current $I_{charge}$ of power transistor $Q_M$ and reference current $I_{ref}$ of reference transistor $Q_r$ can be: $I_{charge}=N \times I_{ref}$. Therefore, current $I_{charge}$ flowing through power transistor $Q_M$ may remain substantially unchanged if reference current $I_{ref}$ flowing through reference transistor $Q_r$ is substantially unchanged. Thus, precharging current $I_{charge}$ of the precharge circuit may remain at a suitable value, rather than changing along with output voltage $V_{out}$.

Figure 2B:
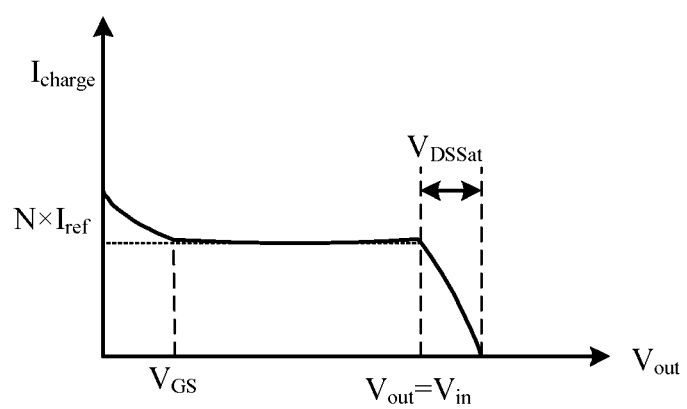
FIG. 2B shows an example waveform diagram of the precharge circuit shown in FIG. 2A.

Referring now to FIG. 2B, shown is an example operating waveform diagram for the precharge circuit shown in FIG. 2A. During an initial start-up phase, with $V_{out}$ at zero, the voltage at node $N_5$ may also be zero. Because channel-length modulation can occur between reference transistor $Q_r$ and power transistor $Q_M$, precharging current $I_{charge}$ can be slightly larger than $N \times I_{ref}$. Output voltage $V_{out}$ may increase gradually, and when $V_{out} > |V_{GS}|$ ($V_{GS}$ is the gate-source voltage of transistor $Q_1$), the voltage at node $N_1$ may change along with the voltage at node $N_2$ because of the clamping control of voltage clamping circuit 201.

For example, if the output voltage at node $N_2$ is increasing, the voltage at node $N_1$ may accordingly increase. The voltages at nodes $N_1$ and $N_2$ may be substantially equal, and precharging current $I_{charge}$ can equal $N \times I_{ref}$ based on the current mirror principle. When the drain-source voltage of power transistor $Q_M$ is smaller than saturation voltage $V_{DSSat}$, power transistor $Q_M$ may enter the linear region of operation, and precharging current $I_{charge}$ may decrease significantly. As shown in FIG. 2B, during the precharge phase of the output voltage, the precharging current can be set at an expected value by disabling the precharge mode before the drain-source voltage of power transistor $Q_M$ becomes smaller than saturation voltage $V_{DSSat}$.

In particular embodiments, the system can be enabled to be in the start-up phase until output voltage $V_{out}$ is charged to a predetermined amount (e.g., about 90%, about 75%, about 95%, etc.) of the input voltage. In this way, the precharging current can be maintained at an expected current value to "fast start" the load. Also in particular embodiments, control of the precharge mode and normal start-up operation mode can occur by turning on/off switch $S_1$. For example, switch $S_1$ can be controlled by precharging control signal $V_c$. In some cases, precharge and control signal $V_c$ can be generated based on a power-up reset signal, based on a particular mode of operation, based on a load characteristics (e.g., a relatively heavy load or a relatively light load), and/or fast start-up characteristics (e.g., applications requiring a certain level of $V_{out}$ within a relatively short period of time), or any other suitable mechanism.

As also seen from FIG. 2B, during the control procedure of precharging current, as the drain voltage of reference transistor $Q_r$ is controllable, drain-source voltages of reference transistor $Q_r$ and power transistor $Q_M$ can be substantially equal. According to channel-length modulation, when the difference between drain-source voltages of reference transistor $Q_r$ and power transistor $Q_M$ becomes smaller, the difference between current flowing through those transistors also becomes smaller. Therefore, the precharging current of particular embodiments may be relatively low as compared to that of conventional approaches during an initial start-up phase, potentially resulting in reduced power loss.

In addition, the drain voltage of reference transistor $Q_r$ can follow the output voltage variation so as to control the precharging current to quickly reach to an expected or predetermined value. Further, the precharging current can be maintained at the expected value for a relatively long period. Thus, various requirements for output voltages and precharging currents under different conditions can be satisfied, and users can flexibly control the output voltages and precharging currents, in particular embodiments.

Also, when loads of the DC-DC boost converter are under different conditions, precharge circuits of particular embodiments can regulate the precharging current according to the load value. For example, the relationship of precharging current $I_{charge}$ and reference current $I_{ref}$ may be: $I_{charge}=N \times I_{ref}$, where, $I_{ref}=V_{ref}/R$, so $I_{charge}=N \times (V_{ref}/R)$. When the load is relatively small, the required start-up current may also be relatively small. Thus, reference voltage $V_{ref}$ can be set to be lower to reduce $I_{ref}$ and to obtain a relatively small precharging current, so as to meet start-up requirements under small load conditions. When the load is relatively large, the required start-up current may also be relatively large. Thus, reference voltage $V_{ref}$ can be set to be higher to increase $I_{ref}$ and to obtain a relatively large precharging current, so as to meet start-up requirements under relatively large load conditions. In addition, particular embodiments can regulate the reference current by changing reference resistor R, based on the formulas discussed above.

In one embodiment, a precharge method for a DC-DC boost converter having a current mirror circuit that includes a reference transistor and a power transistor, can include: (i) maintaining a reference current flowing through the reference transistor as substantially constant; (ii) maintaining a drain-source voltage of the reference transistor and a drain-source voltage of the power transistor as substantially equal; and (iii) obtaining a substantially constant mirror current by reflecting the reference current through the power transistor to operate as a precharging current of a precharge circuit.

Figure 3:
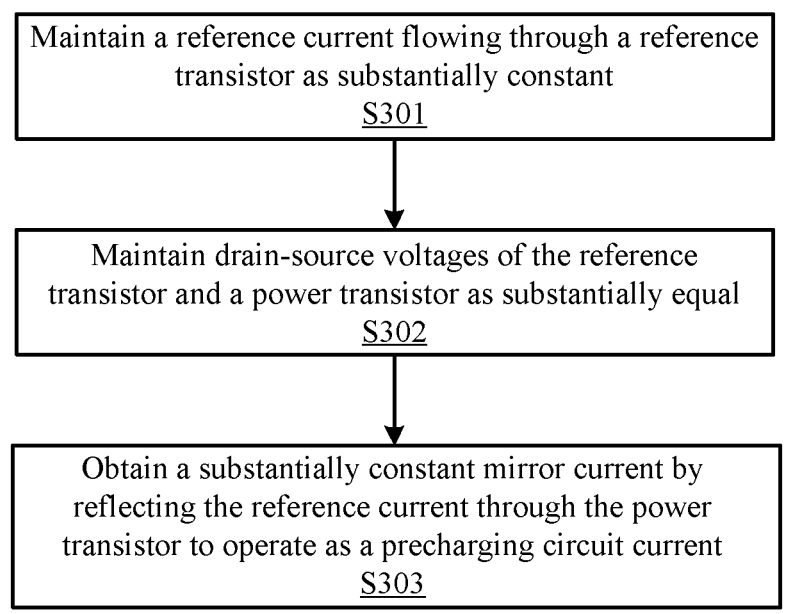
FIG. 3 shows a flow diagram of an example precharge method for a DC-DC boost converter, in accordance with embodiments of the present invention.

Referring now to FIG. 3, shown is a flow diagram of an example precharge method for a DC-DC boost converter in accordance with embodiments of the present invention. In this example, at S301, a reference current flowing through a reference transistor can be maintained as substantially constant. At S302, a drain-source voltage of the reference transistor can follow a drain-source voltage variation of a power transistor, to keep the drain-source voltages of the reference transistor and the power transistor as substantially equal to each other. At S303, a constant mirror current can be obtained by reflecting the reference current through the power transistor to operate as a precharging current of the precharge circuit.

At step S301, when the reference current is decreasing, a gate-source voltage of the reference transistor can be increased to improve the reference current. On the other hand, when the reference current is increasing, the gate-source voltage of the reference transistor can be reduced to lower the reference current. Also, at step S302, a drain voltage of the reference transistor can be controlled to follow the drain voltage variation of the power transistor to maintain the drain voltages of the reference transistor and the power transistor as substantially equal.

In precharge circuits and methods for DC-DC boost converters disclosed according to particular embodiments, the reference current can be maintained as substantially steady through the feedback control of the current regulating circuit. Also, the drain voltage of the reference transistor can be clamped through the voltage clamping circuit to maintain the drain-source voltages of the reference transistor and the power transistor as substantially equal. This can ensure that the precharging current may not change along with the output voltage. In particular embodiments, not only is the output voltage precharge, but the precharging current is also maintained as substantially unchanged to meet relatively fast start-up requirements during the precharge phase. Also, precharge control techniques of particular embodiments may have a relatively smaller start-up precharging current, and can regulate the precharging current according to different load values to further reduce power losses. In addition, the precharging current can relatively quickly reach to a predetermined fixed value, and can be maintained as substantially constant for a relatively long period, with better stability, as compared to conventional approaches.

The above has described some example embodiments of the present invention, but practitioners with ordinary skill in the art will also recognize that other techniques or circuit structures can also be applied in accordance with embodiments of the present invention. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A precharge method for a DC-DC boost converter comprising a current mirror circuit having a reference transistor and a power transistor, the method comprising:
    a) maintaining a reference current flowing through said reference transistor as substantially constant by comparing a voltage at a first node in a voltage clamping circuit against a reference voltage to generate an error voltage, and by controlling said reference transistor by said error voltage;
    b) maintaining, by said voltage clamping circuit, a drain-source voltage of said reference transistor and a drain-source voltage of said power transistor as substantially equal, wherein said voltage clamping circuit comprises a first transistor having a source directly connected to a drain of said reference transistor, and a drain directly connected to a sampling resistor at said first node; and
    c) obtaining a substantially constant mirror current by reflecting said reference current through said power transistor to operate as a precharging current of a precharge circuit, wherein said current mirror circuit comprises an inductor coupled between sources of said reference transistor and said power transistor.

2. The method of claim 1, wherein said maintaining said reference current flowing through said reference transistor as substantially constant comprises:
    a) increasing a gate-source voltage of said reference transistor when said reference current is decreasing, to increase said reference current; and
    b) reducing said gate-source voltage of said reference transistor when said reference current is increasing, to lower said reference current.

3. The method of claim 1, wherein said maintaining said drain-source voltage of said reference transistor and said drain-source voltage of said power transistor as substantially equal comprises controlling a drain voltage of said reference transistor to follow a drain voltage variation of said power transistor.

4. The method of claim 1, wherein said voltage clamping circuit further comprises a second transistor coupled to said power transistor and a current-stabilizer circuit, wherein gates of said first and second transistors are coupled together and to a drain of said second transistor.

5. The method of claim 1, wherein said power transistor models a main power transistor of said DC-DC boost converter.

6. The method of claim 1, further comprising controlling a switch coupled between gates of said reference transistor and said power transistor by using a precharging control signal to select a precharge mode.

7. The method of claim 1, further comprising controlling a switch coupled between gates of said reference transistor and said power transistor by using a precharging control signal to indicate a heavy load condition or a light load condition.

8. The method of claim 1, further comprising controlling a switch coupled between gates of said reference transistor and said power transistor by using a precharging control signal to indicate a fast start-up operation.

9. A precharge circuit configured with a DC-DC boost converter, the precharge circuit comprising:
    a) a current mirror circuit having a reference transistor and a power transistor, wherein said current mirror circuit comprises an inductor coupled between sources of said reference transistor and said power transistor;
    b) a voltage clamping circuit coupled to said current mirror circuit, wherein said voltage clamping circuit is configured to maintain drain-source voltages of said reference transistor and said power transistor as substantially equal, wherein said voltage clamping circuit comprises a first transistor having a source directly connected to a drain of said reference transistor, and a drain directly connected to a sampling resistor at a first node; and
    c) a current regulating circuit coupled to said current mirror circuit and said voltage clamping circuit, wherein said current regulating circuit is configured to compare a voltage at said first node of said voltage clamping circuit against a reference voltage to generate an error voltage, and to control said reference transistor by said error voltage for regulation of a reference current and a precharging current of said precharge circuit as substantially constant.

10. The precharge circuit of claim 9, wherein said voltage at said first node is configured to represent a current through said reference transistor.

11. The precharge circuit of claim 9, wherein a drain voltage of said reference transistor is configured to be clamped by said voltage clamping circuit to maintain said drain voltage of said reference transistor and a drain voltage of said power transistor as substantially equal.

12. The precharge circuit of claim 9, wherein said reference voltage is set according to a load of said DC-DC boost converter.

13. The precharge circuit of claim 9, wherein said voltage clamping circuit further comprises a second transistor coupled to said power transistor and a current-stabilizer circuit, wherein gates of said first and second transistors are coupled together and to a drain of said second transistor.

14. The precharge circuit of claim 13, wherein said current regulating circuit comprises an error amplifier having:
    a) a non-inverting input terminal directly connected to said first node;
    b) an inverting input terminal coupled to said reference voltage; and
    c) an output terminal coupled to gates of said reference transistor and said power transistor.

15. The precharge circuit of claim 14, wherein:
a) a voltage at said first node is configured to represent said reference current flowing through said reference transistor;
b) said error amplifier is configured to output a negative error voltage signal to increase said reference current when said common node voltage is less than said reference voltage; and
c) said error amplifier is configured to output a positive error voltage signal to reduce said reference current when said common node voltage is greater than said reference voltage.

16. The precharge circuit of claim 9, wherein a voltage at said first node is substantially constant.

17. The precharge circuit of claim 9, wherein said power transistor models a main power transistor of said DC-DC boost converter.

18. The precharge circuit of claim 9, wherein said current mirror circuit comprises a switch coupled between gates of said reference transistor and said power transistor, and wherein said switch is controllable by a precharging control signal to select a precharge mode.

19. The precharge circuit of claim 9, wherein said current mirror circuit comprises a switch coupled between gates of said reference transistor and said power transistor, and wherein said switch is controllable by a precharging control signal to indicate a heavy load condition or a light load condition.

20. The precharge circuit of claim 9, wherein said current mirror circuit comprises a switch coupled between gates of said reference transistor and said power transistor, and wherein said switch is controllable by a precharging control signal to indicate a fast start-up operation.

* * * * *